W. N. STROUD.

WHEEL.

No. 11,168. Reissued May 26, 1891.

Witnesses.
W. C. Corlies
Wm M. Le Moyne

Inventor
Wiley N. Stroud
by
Louis C. Le Moyne
his atty

UNITED STATES PATENT OFFICE.

WILEY N. STROUD, OF WAXAHACHIE, TEXAS.

WHEEL.

SPECIFICATION forming part of Reissued Letters Patent No. 11,168, dated May 26, 1891.

Original No. 401,080, dated April 9, 1889. Application for reissue filed March 19, 1891. Serial No. 385,691.

*To all whom it may concern:*

Be it known that I, WILEY N. STROUD, a citizen of the United States, residing at Waxahachie, county of Ellis, State of Texas, have invented a new and useful Improvement in Wheels, of which the following is a specification.

My invention relates to improvements in wheels particularly designed for use on harvesters in heavy or muddy ground; and it consists of details of construction hereinafter more fully described, and particularly pointed out in the claims.

Figure 1:
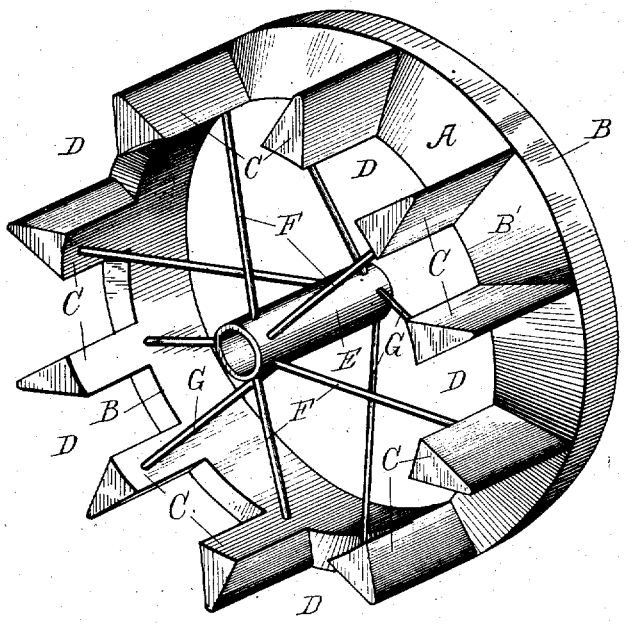
Figure 2:
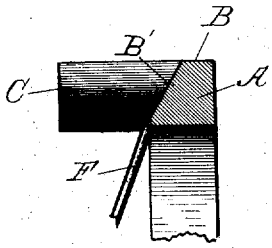

Figure 1 is a perspective view of a wheel embodying my invention. Fig. 2 is a detail view showing the rim of the wheel in cross-section.

Referring by letter to the drawings, A designates the rim of the wheel, of which B is the outer face or tread of the wheel, one side of the rim being vertical and the other B′ inclined or beveled.

C C designates lateral wedge-shaped lugs or projections upon the beveled side of the rim, the outer edges of which are about flush with the tread of the wheel. The projections C C are independent of one another, leaving open spaces D D between them, in order that when passing over soft muddy soil the mud will be forced up between them and the lugs take a firm hold on the ground, thereby adding to the traction of the wheel, and the mud passing up through it the wheel cleans itself and does not become clogged up. The lugs being wedge-shaped and the side of the rim being beveled, they shed the mud more readily in addition to their inclined faces adding somewhat to the buoyancy of the wheel. These lugs being upon the side of the rim of the wheel and flush with or within its periphery are relieved from strain in passing over hard ground, and the wheel runs upon a smooth unbroken tread.

E designates the hub of the wheel, which extends from the outer side of the rim A to the inner extremities of the lugs or projections.

F F designate the inner spokes, which are attached at their adjacent ends to the inner end of the hub and at their outer or remote ends to the rim A.

G G designates the outer spokes, which are attached at their adjacent or inner ends to the outer end of the hub, and at their outer ends or remote ends to the free or unsupported ends of said lugs or projections, from which it will be seen that the inner spokes are inclined outwardly and the outer spokes inclined inwardly toward their remote ends, whereby compression of the rim of the wheel is transformed into lateral thrusts on the hub, and the lateral thrusts counterbalance each other.

What I claim, and desire to secure by Letters Patent, is—

1. The herein-described wheel, consisting of the combination of the rim A, having the face B, forming the tread of the wheel, the laterally-projecting independent wedge-shaped lugs C C on the side of said rim, the hub, and the spokes, all substantially as shown and described.

2. The herein-described wheel, consisting of the combination of the rim A, having the face B, forming the tread of the wheel, and the inclined or beveled side face B′, the laterally-projecting independent wedge-shaped lugs C C on the inclined side of said rim, the hub, and the spokes, all substantially as shown and described.

3. The herein-described wheel, consisting of the combination of the rim A, having the face B, forming the tread of the wheel, and the inclined or beveled side face B′, the laterally-projecting independent wedge-shaped lugs C C on the side of said rim and flush with its outer edge, the hub, and the spokes, all substantially as shown and described.

4. The herein-described wheel, consisting of the combination of the rim A, having the face B, forming the tread of the wheel, and the inclined or beveled side face B′, the laterally-projecting wedge-shaped lugs C C on the inclined side of said rim, the hub, and the spokes supporting the outer ends of said lugs and said rim, all substantially as shown and described.

5. The herein-described wheel, consisting of the combination of the rim A, the laterally-projecting wedge-shaped lugs C C, the hub E, and the outer and inner series of spokes F and G, inclined in opposite directions and attached at their outer ends to alternate lugs, all substantially as shown and described.

WILEY N. STROUD.

Witnesses:
JOHN W. SPENCER,
E. E. HAMILTON.